US006471276B1

(12) United States Patent
Brunsman et al.

(10) Patent No.: US 6,471,276 B1
(45) Date of Patent: Oct. 29, 2002

(54) MOLDED INSERT NETTED MAP POCKET

(75) Inventors: Karl J. Brunsman, Fraser, MI (US); James L. Curtis, Rochester Hills, MI (US)

(73) Assignee: Universal Trim, Inc., Madison Heights, MI (US)

( * ) Notice: Subject to any disclaimer, the term of this patent is extended or adjusted under 35 U.S.C. 154(b) by 0 days.

(21) Appl. No.: 09/498,142

(22) Filed: Feb. 4, 2000

(51) Int. Cl.⁷ .............................. B60N 3/12; B60R 7/04; B27N 3/12; B27N 3/14
(52) U.S. Cl. .................. 296/37.13; 296/37.1; 296/37.8; 264/257; 264/278; 264/279
(58) Field of Search .............................. 296/37.1, 37.8, 296/37.12, 37.13, 37.15, 37.16, 146.7, 149; 265/257, 259, 278, 279

(56) References Cited

U.S. PATENT DOCUMENTS

| | | | |
|---|---|---|---|
| 1,877,265 A | | 9/1932 | Chadwick |
| 1,995,143 A | | 3/1935 | Burch |
| 3,730,581 A | * | 5/1973 | Parkinson ................. 296/37.13 |
| 4,158,985 A | * | 6/1979 | Looker et al. .................. 87/12 |
| 5,009,458 A | | 4/1991 | Shute |
| 5,038,468 A | | 8/1991 | Wanatowicz |
| 5,261,716 A | | 11/1993 | Phelps |
| 5,326,523 A | * | 7/1994 | Gustavel et al. ............. 264/257 |
| 5,340,004 A | * | 8/1994 | Moore ........................ 296/37.1 |
| 5,352,397 A | * | 10/1994 | Hara et al. ................... 264/153 |

(List continued on next page.)

FOREIGN PATENT DOCUMENTS

| | | |
|---|---|---|
| DE | 2418790 | 10/1975 |
| IT | 378020 | 10/1939 |

*Primary Examiner*—D. Glenn Dayoan
*Assistant Examiner*—G Blankenship
(74) *Attorney, Agent, or Firm*—Young & Basile, P.C.

(57) ABSTRACT

A process for insert molding at least a portion of a flexible webbing material within at least a portion of a plastic injection molded part produces a product having a plastic injection molded part with a contour formed by a front surface and a rear surface, and a flexible webbing material having at least a portion embedded within the injection molded plastic part, while a remaining portion of the flexible webbing material extends externally with respect to the injection molded plastic part. An injection molding die is provided for insert molding the portion of the flexible webbing material within at least a portion of the plastic injection molded part. The die defines a chamber for receiving molten plastic during an injection molding step. The chamber is defined by the die having a surface for forming the contour of a front surface of at least one part to be injection molded, and another portion of the chamber having a surface for forming the contour of a rear surface of the at least one part to be injection molded. The chamber is formed by at least two separable portions of the die moveable away from one another along a parting line. A seal is provided along at least a portion of the parting line of the chamber where a flexible webbing material extends internally within the chamber. The seal is a high temperature resistant material selected to have sufficient flexibility to prevent damage to the flexible webbing material during the sealing step.

33 Claims, 3 Drawing Sheets

U.S. PATENT DOCUMENTS

| | | | | |
|---|---|---|---|---|
| 5,443,778 A | * | 8/1995 | Schlingman | 264/257 |
| 5,499,853 A | | 3/1996 | Pourian | |
| 5,535,571 A | * | 7/1996 | Nichols | 296/37.13 |
| 5,593,631 A | * | 1/1997 | Hara et al. | 264/257 |
| 5,650,181 A | | 7/1997 | Kotaki | |
| 5,685,470 A | * | 11/1997 | Moore | 224/567 |
| 5,714,175 A | * | 2/1998 | Masui et al. | 425/123 |
| 5,716,091 A | * | 2/1998 | Wieczorek | 296/37.16 |
| 5,752,459 A | * | 5/1998 | Rexroad | 112/440 |
| 5,759,464 A | * | 6/1998 | Matsumoto et al. | 264/138 |
| 5,770,134 A | * | 6/1998 | Hara et al. | 264/154 |
| 5,807,515 A | | 9/1998 | Fisher et al. | |
| 5,860,350 A | * | 1/1999 | Rexroad | 87/6 |
| 5,899,522 A | | 5/1999 | DeRees et al. | |
| 6,060,146 A | * | 5/2000 | Akeno et al. | 428/100 |
| 6,092,705 A | * | 7/2000 | Meritt | 296/37.16 |
| 6,120,077 A | * | 9/2000 | Westphal et al. | 296/37.1 |
| 6,146,122 A | * | 11/2000 | Kato | 425/125 |
| 6,280,674 B1 | * | 8/2001 | Kreuzer | 264/259 |
| 6,348,170 B1 | * | 2/2002 | Masui et al. | 264/266 |
| 6,413,461 B1 | * | 7/2002 | Kobayashi et al. | 264/257 |

* cited by examiner

MOLDED INSERT NETTED MAP POCKET

FIELD OF THE INVENTION

The present invention relates to a process for insert molding at least a portion of a flexible webbing material within at least a portion of a plastic injection molded part, the part having a flexible webbing material at least partially embedded within at least a portion of a plastic injection molded part, and an injection molding die for producing a molded insert netted map pocket for attachment to an interior of a motor vehicle.

BACKGROUND OF THE INVENTION

It has been known to provide a pocket part for a vehicle door to enhance the function and appearance of the door while reducing the cost of manufacture and assembly of the door. Vehicle pocket assemblies extend from the door of the vehicle toward the passenger compartment and are useful for storing items such as tools, books, maps, and other personal items. A known vehicle pocket arrangement includes an outwardly depending flap covered with trim material formed integral with a filler board of a vehicle body door trim panel. The filler board is slightly larger than the depending flap and has trim material secured to the lateral and lower edge portions to provide a pocket panel having a generally upwardly opening pocket. The pocket panel is positioned to the rear of the trim panel and is moved upwardly to insert the flap within the pocket. The pocket material includes downwardly pointing integral portions allowing expansion of the pocket while depositing articles within the pocket. Another known configuration substitutes netting material for the trim material, where the netting material is trapped between the inner door panel facing the passenger compartment and a pocket frame trim part which is engaged over the edges of the separate webbing material and attached to the door panel for holding the netting in place with respect to the door panel. This configuration requires a great deal of time to assemble, is subject to loosening of the frame with respect to the inner panel, and loss of the captured netting material between the frame and the door panel.

SUMMARY OF THE INVENTION

It would be desirable to provide a more cost effective solution for a netted pocket attachable to the interior panel of a vehicle. It would be desirable to insert mold or embed at least a portion of a flexible webbing material within at least a portion of a plastic injection molded part. It would be desirable to provide a product having a plastic injection molded part with a portion of an associated flexible webbing material at least partially embedded within the injection molded plastic part, while a remaining portion of the flexible webbing material extends externally with respect to the injection molded plastic part. It would be desirable to provide an injection molding die for forming an injection molded part with at least a portion of flexible webbing material embedded within a portion of the plastic injection molded part.

A process according to the present invention can be used for insert molding at least a portion of a flexible webbing material within at least a portion of a plastic injection molded part. The process includes the steps of providing a predetermined amount of flexible webbing material with at least a portion of the material to be embedded within a plastic injection molded part, positioning the flexible webbing material with respect to an open plastic injection molding die defining a chamber for receiving molten plastic during an injection molding step. The chamber is defined by the die having a surface for forming the contour of the front surface of the part to be injection molded and another portion of the chamber having a surface defining a rear surface of the part to be injection molded. The chamber is formed by at least two separable portions of the die moveable away from one another along a parting line. The process also includes the step of sealing the chamber along the parting line where the flexible webbing extends internally within the chamber with a high temperature resistant material selected to have sufficient flexibility to prevent damage to the flexible webbing material during the sealing step.

A product according to the present invention includes a plastic injection molded part having a contour formed by a front surface and a rear surface, and a flexible webbing material having at least a portion to be embedded within the injection molded plastic part, while a remaining portion of the flexible webbing extends externally with respect to the injection molded plastic part. The product according to the present invention can be manufactured using the process of the present invention. Preferably, the flexible webbing extends externally of the plastic injection molded part along an interface between the front surface and the rear surface of the plastic injection molded part. Preferably, the product defines a unitary body formed from the plastic injection molded part and flexible webbing material to define a vehicle pocket for attachment to an interior of a motor vehicle.

An injection molding die according to the present invention can be used for insert molding at least a portion of a flexible webbing material within at least a portion of a plastic injection molded part. The plastic injection molding die defines a chamber for receiving molten plastic during an injection molding step. The chamber is defined by the die having a surface for forming the contour of a front surface of at least one part to be injection molded and another portion of the chamber having a surface defining a rear surface of the part to be injection molded. The chamber is formed by at least two separable portions of the die moveable away from one another along a parting line. A seal is provided along at least a portion of the parting line of the chamber where the flexible webbing material extends internally within the chamber. The seal is preferably a high temperature resistant material selected to have sufficient flexibility to prevent damage to the flexible webbing material during the sealing step. The chamber is sealable by moving the portions of the die toward one another and engaging the flexible webbing between the sealing material and the die prior to injecting molten plastic into the chamber. Depending on the characteristics of the webbing to be embedded, retractable fingers can be provided if required within the die for engaging the flexible webbing to move the flexible webbing from adjacent the front surface of the chamber toward the rear surface of the chamber prior to injecting molten plastic. Preferably, the fingers are retractable after injecting molten plastic into the chamber and prior to the injected molten plastic solidifying in the vicinity of the fingers. The chamber forms a unitary body from the plastic injection molded part and flexible webbing material to define a vehicle pocket for attachment to an interior of a motor vehicle.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
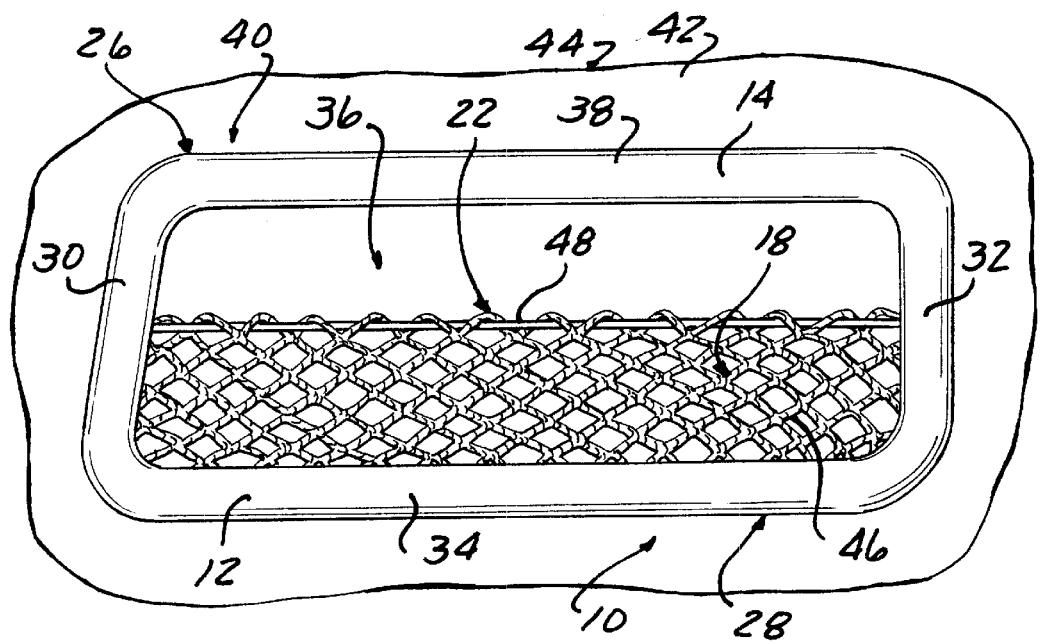
FIG. 1 is a front view of a product according to the present invention having a plastic injection molded part with a contour formed by a front surface and a rear surface and a flexible webbing material having at least a portion embedded within the injection molded plastic part.
Figure 2:
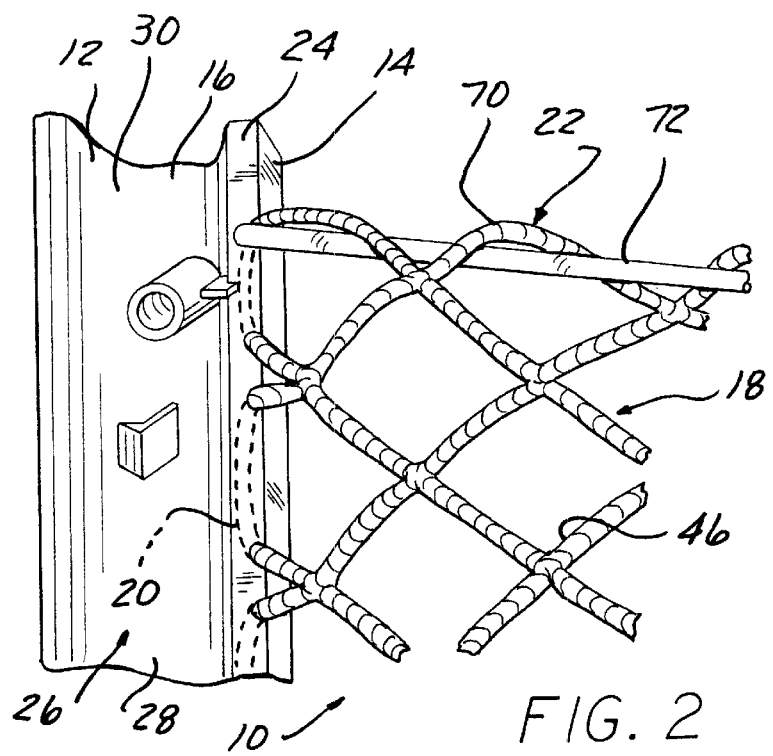
FIG. 2 is a detailed rear view of a portion of the product of FIG. 1 showing a portion of the flexible webbing material extending externally with respect to the injection molded plastic part.

Referring to FIGS. 1 and 2, a product 10 plastic injection molded part 12 having a contour formed by a front surface 14 and a rear surface 16. A flexible webbing material 18 is provided having at least a first portion 20 to be embedded within the injection molded plastic part 12, while a remaining portion 22 of the flexible webbing material 18 extends externally with respect to the injection molded plastic part 12. The flexible webbing material 18 preferably extends externally of the plastic injection molded part 12 along an interface 24 between the front surface 14 and the rear surface 16 of the plastic injection molded part 12.

In the preferred embodiment, the plastic injection molded part 12 defines a frame 26 having at least one frame member 28 with first and second portions 30, 32 spaced from one another. The flexible webbing material 18 is connected to and extends between the first and second portions 30, 32 of the frame member 28 providing a flexible webbed surface extending therebetween. The frame member 28 can also include a third portion 34 extending between and connecting the first and second portions 30, 32 with respect to one another in a single, unitary, integral piece. The flexible webbing material 18 preferably is insert molded within the third portion 34 along an entire longitudinal length and along at least a portion of a longitudinal length of the first and second portions 30, 32 of the frame member 28 to define an open flexible web pocket 36 between the first, second, and third portions 30, 32, 34 respectively of the frame member 28. A unitary, single piece body 38 can be formed from the plastic injection molded part 12 and the flexible webbing material 18 to define a vehicle pocket to be attached to an interior surface 42 of a motor vehicle 44. By way of example and not limitation, the interior surface 42 can be an inner door panel of a motor vehicle 44.

The flexible webbing material 18 can include at least a first portion 46 of inelastic webbing material, and a second portion 48 of elastic webbing material. The second portion 48 of elastic webbing material can be positioned adjacent the opening for the web pocket 36 to provide a self closing, article capture function. Alternatively, the entire flexible webbing material 18 can be formed of elastic webbing material. The flexible webbing material 18 can include at least a portion 50 of the material being of a woven, cylindrical, rope-like material woven into an interlocking mesh, or threaded above and below alternating strands of rope material 50 to create a desired mesh pattern. Alternatively, the flexible webbing material 18 can include at least a portion of a flat, planar, woven material 52 with a generally rectangular cross-section as seen in the embodiment illustrated in FIG. 5.

Figure 4:
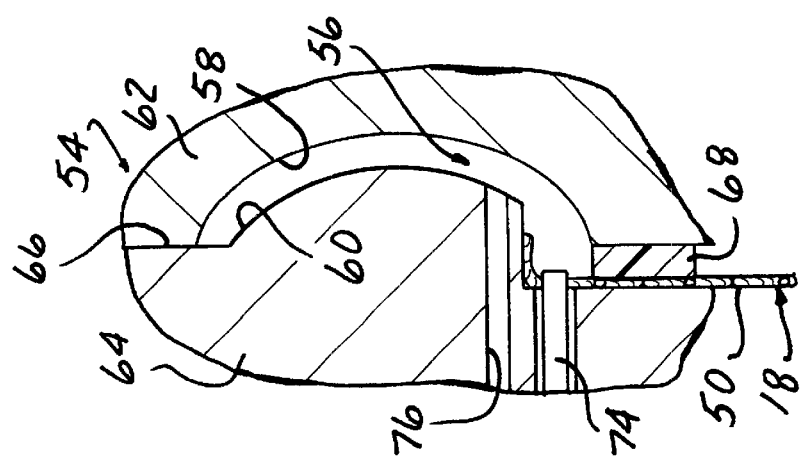
FIG. 4 is a simplified cross-sectional detailed view of the injection molding die according to the present invention shown in FIG. 3 prior to injection of the molten plastic.
Figure 3:
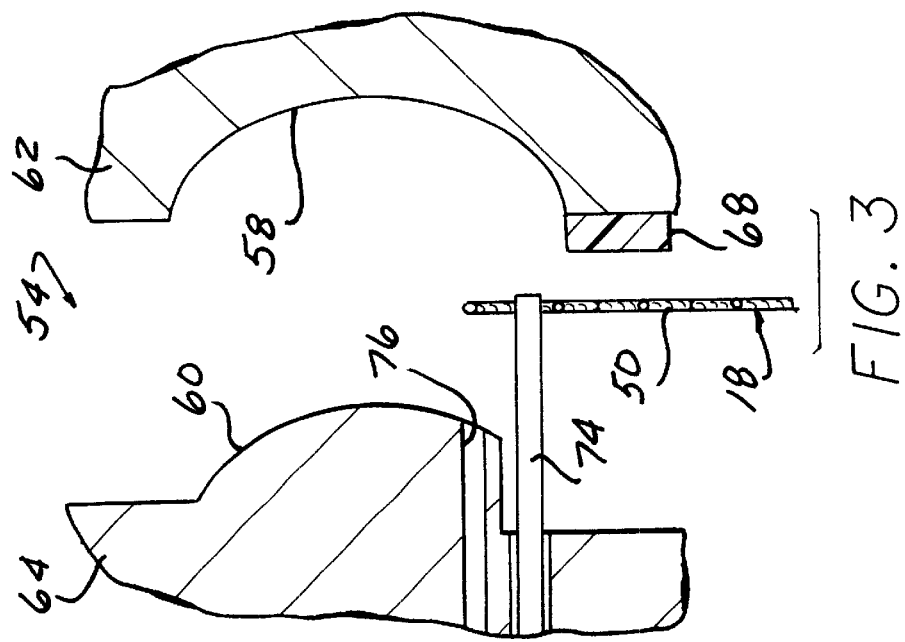
FIG. 3 is a simplified cross-sectional detailed view of an injection molding die for insert molding at least a portion of a flexible webbing material within at least a portion of a plastic injection molded part with the die in an open position and including fingers to engage and move the flexible webbing material toward a rear surface of the injection molding chamber.
Figure 6:
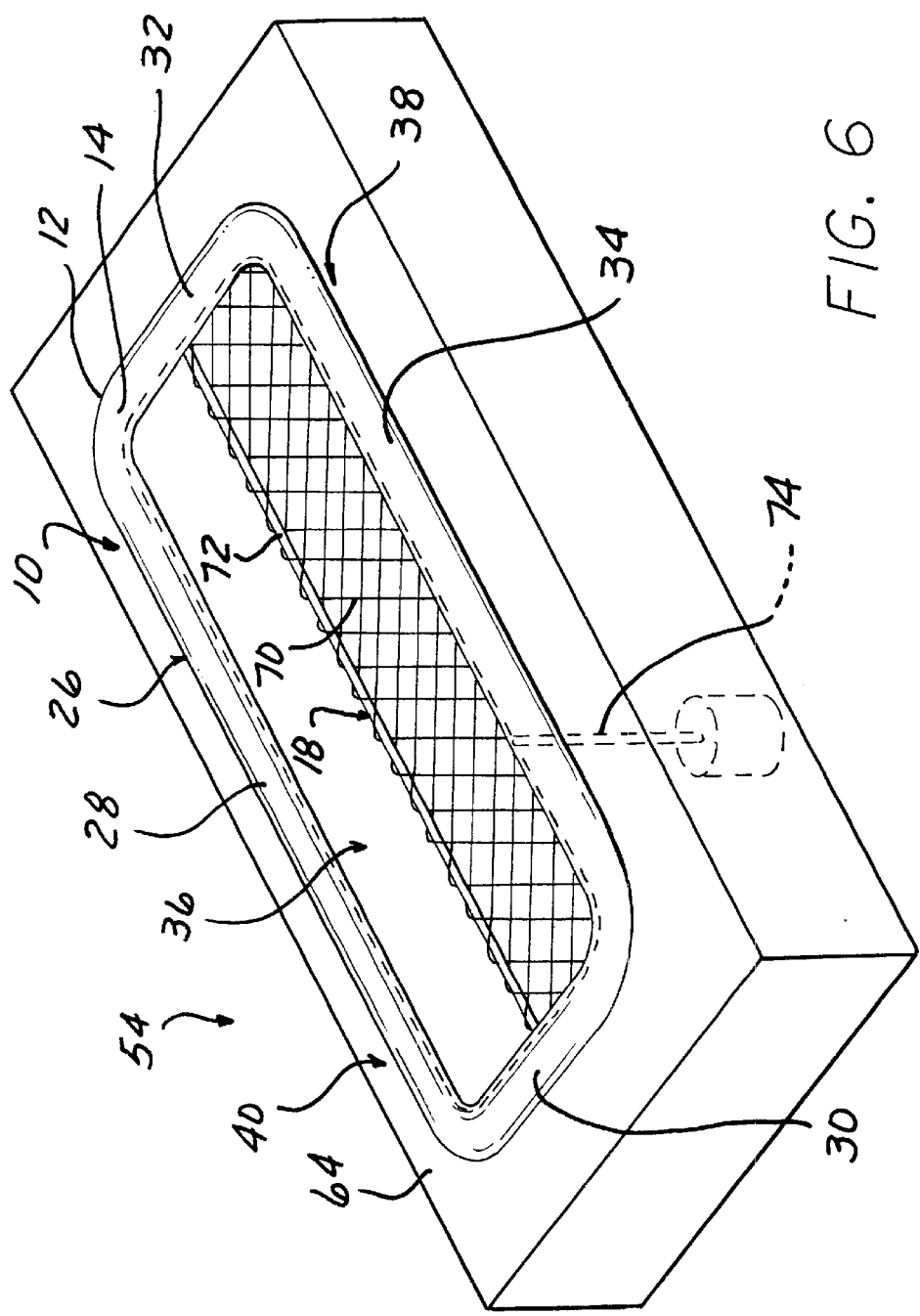
FIG. 6 is a perspective view of a portion of an injection molding die with a product formed therein after the fingers have been retracted and prior to the part being ejected from the mold.

An injection molding die 54 according to the present invention, and a process for insert molding at least a portion of a flexible webbing material 18 within at least a portion of a plastic injection molded part 12 can best be understood by reference to FIGS. 3, 4 and 6. The plastic injection molding die 54 defines a chamber 56 for receiving molten plastic during an injection molding step. The chamber 56 is defined by the die 54 having a surface 58 for forming the contour of a front surface 14 of at least one part 12 (as best seen in FIGS. 1 and 2) to be injection molded, and another portion of the chamber 56 having a surface 60 defining a rear surface 16 of the part 12 (as seen in FIGS. 1 and 2) to be injection molded. The chamber 56 is formed by at least two separable portions 62, 64 of the die 54 moveable away from one another along a parting line 66. A seal 68 is disposed along at least a portion of the parting line 66 adjacent the chamber 56 where the flexible webbing material 18 extends internally within the chamber 56. The seal 68 is a high temperature resistant material selected to have sufficient flexibility to prevent damage to the flexible webbing material 18 during the sealing step. The chamber 56 is sealable by moving the two separable portions 62, 64 of the die 54 toward one another and engaging the flexible webbing material 18 between the seal 68 and the die 54 prior to injecting molten plastic into the chamber 56. The seal 68 is preferably a high temperature resistant material with sufficient flexibility to prevent damage to the flexible webbing material 18 and is selected from a group consisting of silicon B, high temperature epoxy, and high temperature urethane. The chamber preferably forms a unitary body 38 from the plastic injection molded part 12 and flexible webbing material 18 to define a vehicle pocket 40 for attachment to an interior surface 42 of a motor vehicle 44. The vehicle pocket 40 can include a net portion formed by the flexible webbing material 18 and a frame portion defined by at least one frame member 28 preferably formed into a single unitary body 38.

Figure 5:
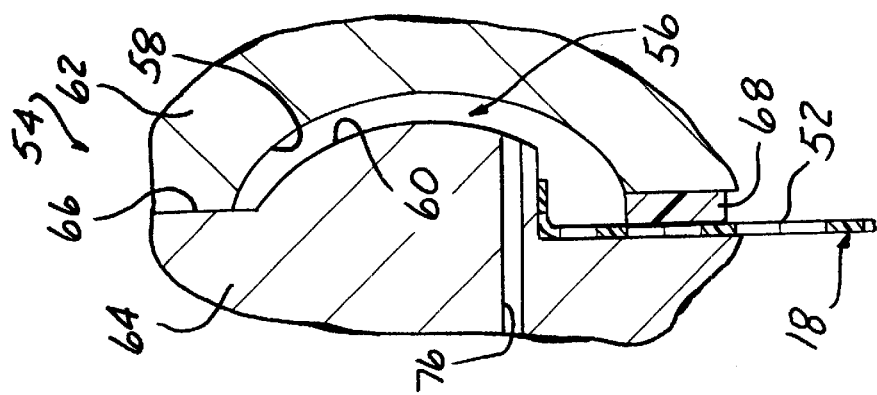
FIG. 5 is a simplified cross-sectional detailed view-of an alternative configuration of an injection molding die according to the present invention in the closed position prior to injection of the molten plastic.

The flexible webbing material 18 is positionable within the chamber 56, and preferably includes at least a portion of inelastic webbing material 70 and at least a portion of elastic material 72. Alternatively, or additionally, the flexible webbing material 18 can have at least a portion of woven, cylindrical, rope-like material 50 woven together to form a desired mesh pattern. Alternatively, or additionally, the flexible webbing material 18 can have at least a portion of flat, planar, woven material 52 with a rectangular cross-section, as best seen in FIG. 5. Referring briefly to FIG. 5, it is believed that the use of certain flexible webbing materials 18 for embedding within at least a portion of a plastic injection molded part 12 could be accomplished by trapping a portion of the flexible webbing material 18 between the two separable portions 62, 64 of the die 54 prior to injecting molten plastic without the aid of mechanical positioning mechanisms. This configuration would require a flexible webbing material with appropriate stiffness, or bending properties, to insure that the flexible webbing material 18 is normally disposed adjacent the rear surface 16 of the plastic injection molded part 12 after the molding process. If the flexible webbing material 18 does not consistently position itself adjacent to the rear surface 16 of the plastic injection molded part 12, additional mechanical positioning members, or fingers can be required as illustrated in FIGS. 3 through 4 and 6.

Referring again to FIGS. 3 through 4 and 6, retractable fingers 74 are disposed within the die 54 spaced along the periphery of the interface where the flexible webbing material 18 enters the chamber 56 of the die 54. The retractable fingers 74 engage the flexible webbing material 18 to move the flexible webbing material 18 from a position adjacent the front surface 14 of the plastic injection molded part 12 to be formed in the chamber 56 toward the rear surface 16 of the plastic injection molded part 12 to be formed within the chamber 56 prior to injecting molten plastic. The fingers 74 are preferably retractable after injecting molten plastic into the chamber 56 through passage 76, and prior to the injected molten plastic solidifying in the vicinity of the fingers 74.

In operation, a process according to the present invention for insert molding at least a portion of a flexible webbing material 18 within at least a portion of a plastic injection molded part 12 would include the steps of providing a predetermined amount of flexible webbing material 18 with at least a portion 20 of the material 18 to be embedded within a plastic injection molded part 12. The webbing material 18 can be supplied on a roll. The netting or web material 18 is fed off the roll. A robot can grab the netting with a series of pins and feed the netting into an open low pressure injection molding press. The netting can then be trimmed off from the roll to the correct size. The flexible webbing material 18 is positioned with respect to an open plastic injection molding die 54 defining a chamber 56 for receiving molten plastic during an injection molding step. Chamber 56 is defined by the die 54 having surface 58 for forming the contour of the front surface 14 of the part 12 to be injection molded, and another portion of the chamber 56 having surface 60 defining the contour of a rear surface 16 of the part 12 to be injection molded. The chamber 56 is formed by at least two separable portions 62, 64 of the die 54 moveable away from one another along a parting line 66. The chamber 56 is sealed along the parting line 66 where the flexible webbing material 18 extends internally within the chamber 56 with a high temperature resistant material selected to have sufficient flexibility to prevent damage to the flexible webbing material 18 during the sealing step. Cylinder driven grabbers or fingers 74 extend from the core half of the tool to reach out and grab the netting from the robotic arms. The grabbers or fingers 74 retract back into the tool core pulling an edge of the netting into the apertures housing the grabbers. The tool or die 54 closes in preparation for injection of molten plastic through passage 76 into the chamber 56 to encapsulate the portion of the netting or webbing material 18 that remains outside of the apertures housing the grabbers or fingers 74.

Molten plastic is injected into the chamber 56 after the chamber 56 has been sealed by moving the portions 62, 64 of the die 54 toward one another and engaging the flexible webbing material 18 between the seal 68 and the die 54. If required, the flexible webbing material 18 can be engaged with retractable fingers 74 to move the flexible webbing material 18 from adjacent the surface 58 of the chamber 56 toward the rear surface 60 of the chamber 56 prior to injecting molten plastic. The fingers 74 release the webbing material 18 after molten plastic is injected into the chamber 56 prior to the plastic solidifying in the vicinity of the fingers 74. The tool or die 54 opens and an ejector system starts to eject the product 10 off of the core. The grabbers extend out of the tool at the same time as the ejector system operates to release the netting or webbing material 18 that was being held during the injection molding step. The product is then degated and prepared for shipping. The chamber 56 preferably forms a unitary body 38 from the plastic injection molded part 12 and flexible webbing material 18 to define a vehicle pocket 40 for attachment to an interior surface 42 of a motor vehicle 44. Preferably, the flexible webbing material 18 is provided with at least a portion of inelastic webbing material 70 and a portion of elastic webbing material 72. Alternatively, or additionally, the flexible webbing material 18 can be provided with at least a portion of woven, cylindrical, rope material 50. Alternatively, or additionally, the flexible webbing material 18 can be provided with at least a portion of flat, planar, woven material 52 with a rectangular cross-section.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A process for insert molding at least a portion of a flexible webbing material within at least a portion of a plastic injection molded part comprising the steps of:

providing a predetermined amount of flexible webbing material with at least a portion of the material to be embedded within a plastic injection molded part;

positioning the flexible webbing material with respect to an open plastic injection molding die defining a chamber for receiving molten plastic during an injection molding step, the chamber defined by the die having surfaces for forming the contour of the front surface of the part to be injection molded and another portion of the chamber having surfaces defining a rear surface of the part to be injection molded, the chamber formed by at least two separable portions of the die movable away from one another along a parting line; and sealing the chamber along the parting line where the flexible webbing material extends internally within the chamber with a high temperature resistant material selected to have sufficient flexibility to prevent damage to the flexible webbing material during the sealing step.

2. The process of claim 1 further comprising the step of:

injecting molten plastic into the chamber after the chamber has been sealed by moving the portions of the die toward one another and engaging the flexible webbing material between the seal and the die.

3. The process of claim 1 for comprising the step of:

engaging the flexible webbing material with retractable fingers to move the flexible webbing material from the front surface of the chamber toward the rear surface of the chamber prior to injecting molten plastic.

4. The process of claim 3 further comprising the step of:
retracting the fingers after injecting molten plastic into the chamber and prior to the plastic solidifying in the vicinity of the fingers.

5. The process of claim 1 further comprising the step of:
forming a unitary body from the plastic injection molded part and flexible webbing material to define a vehicle pocket for attachment to an interior of a motor vehicle.

6. The process of claim 1 further comprising the step of:
providing the flexible webbing material with at least a portion of inelastic webbing material and a portion of elastic webbing material.

7. The process of claim 1 further comprising the step of:
providing the flexible webbing material with at least a portion of woven, cylindrical, rope material.

8. The process of claim 1 further comprising the step of:
providing the flexible webbing material with at least a portion of flat, planar, woven, material with a rectangular cross-section.

9. The process of claim 1 further comprising the step of:
selecting the high temperature resistant material with sufficient flexibility to prevent damage to the flexible webbing material from a group consisting of silicon B, high temperature epoxy, and high temperature urethane.

10. A product manufactured by the process of claim 1 comprising:
a plastic injection molded part having a contour formed by a front surface and a rear surface; and
a flexible webbing material having at least a portion to be embedded within the injection molded plastic part, while at least a portion of the flexible webbing material extends externally with respect to the injection molded plastic part.

11. The product of claim 10 further comprising:
the flexible webbing material extending externally of the plastic injection molded part along an interface between the front surface and the rear surface of the plastic injection molded part.

12. The product of claim 10 further comprising:
the plastic injection molded portion defining a frame having at least one frame member with first and second portions spaced from one another, and the flexible webbing material connected to and extending between the first and second portions of at least one frame member providing a flexible webbed surface extending therebetween.

13. The product of claim 10 further comprising:
the plastic injection molded portion defining a frame member mountable on a support surface, the frame member having first and second portions spaced from one another, and a third portion extending between and connecting the first and second portions with respect to one another in a single, unitary, integral piece, and the flexible webbing material insert molded within the third portion along an entire longitudinal length and along at least a portion of a longitudinal length of the first and second portions of the frame member to define part of an openable flexible web pocket between the first, second, and third portions of the frame member when the frame member is mounted with respect to the support surface.

14. The product of claim 10 further comprising:
a unitary body formed from the plastic injection molded part and flexible webbing material to define part of a pocket for attachment to an interior of a motor vehicle.

15. The product of claim 10 further comprising:
the flexible webbing material having at least a portion of inelastic webbing material and a portion of elastic webbing material.

16. The product of claim 10 further comprising:
the flexible webbing material having at least a portion of woven, cylindrical, rope material.

17. The product of claim 10 further comprising:
the flexible webbing material having at least a portion of flat, planar, woven, material with a rectangular cross-section.

18. A product comprising:
a plastic injection molded part having a contour formed by a front surface and a rear surface; and
a flexible webbing material having at least a portion to be embedded within the injection molded plastic part, while at least a portion of the flexible webbing material extends externally with respect to the injection molded plastic part.

19. The product of claim 18 further comprising:
the flexible webbing material extending externally of the plastic injection molded part along an interface between the front surface and the rear surface of the plastic injection molded part.

20. The product of claim 18 further comprising:
the plastic injection molded part defining a frame having at least one frame member with first and second portions spaced from one another, and the flexible webbing material connected to and extending between the first and second portions of the at least one frame member providing a flexible webbed surface extending therebetween.

21. The product of claim 18 further comprising:
the plastic injection molded part defining a frame member mountable on a support surface, the frame member having first and second portions spaced from one another, and a third portion extending between and connecting the first and second portions with respect to one another in a single, unitary, integral piece, and the flexible webbing material insert molded within the third portion along an entire longitudinal length and along at least a portion of a longitudinal length of the first and second portions of the frame member to define part of an openable flexible web pocket between the first, second, and third portion of the frame member when the frame member is mounted with respect to the support surface.

22. The product of claim 18 further comprising:
a unitary body formed from the plastic injection molded part and flexible webbing material to define part of a pocket for attachment to an interior of a motor vehicle.

23. The product of claim 18 further comprising:
the flexible webbing material having at least a portion of inelastic webbing material and a portion of elastic webbing material.

24. The product of claim 18 further comprising:
the flexible webbing material having at least a portion of woven, cylindrical, rope material.

25. The product of claim 18 further comprising:
the flexible webbing material having at least a portion of flat, planar, woven, material with a rectangular cross-section.

26. The product of claim 10 further comprising:
the injection molded part defining a frame member having a non-planar cross-section adjacent locations of connection for the flexible webbing material.

27. The product of claim 10 further comprising:

the injection molded part defining a frame member having at least a portion with a non-planar cross-section, the non-planar cross-section of the frame member defined by at least one of the front surface and the rear surface having a curved contour.

28. The product of claim 13 further comprising:

the flexible webbing material insert molded along only a portion of the longitudinal length of the first and second portions of the frame member adjacent to the third portion.

29. The product of claim 28 further comprising:

a fourth portion of the frame member extending between the first and second portions opposite from the third portion to define an open aperture between the fourth portion of the frame member and the flexible webbing material extending between the first and second portions of the frame member.

30. The product of claim 18 further comprising:

the injection molded part defining a frame member having a non-planar cross-section adjacent locations of connection for the flexible webbing material.

31. The product of claim 18 further comprising:

the injection molded part defining a frame member having at least a portion with a non-planar cross-section, the non-planar cross-section of the frame member defined by at least one of the front surface and the rear surface having a curved contour.

32. The product of claim 21 further comprising:

the flexible webbing material insert molded along only a portion of the longitudinal length of the first and second portions of the frame member adjacent to the third portion.

33. The product of claim 32 further comprising:

a fourth portion of the frame member extending between the first and second portion opposite from the third portion to define an open aperture between the fourth portion of the frame member and the flexible webbing material extending between the first and second portions of the frame member.

* * * * *